(12) United States Patent
Hogan

(10) Patent No.: US 8,556,413 B2
(45) Date of Patent: Oct. 15, 2013

(54) PROTECTIVE EYEWEAR

(76) Inventor: Christine K Hogan, Topeka, KS (US)

( * ) Notice: Subject to any disclaimer, the term of this patent is extended or adjusted under 35 U.S.C. 154(b) by 27 days.

(21) Appl. No.: 13/310,283

(22) Filed: Dec. 2, 2011

(65) Prior Publication Data

US 2012/0140163 A1 Jun. 7, 2012

Related U.S. Application Data

(60) Provisional application No. 61/419,441, filed on Dec. 3, 2010.

(51) Int. Cl.
*G02C 5/08* (2006.01)

(52) U.S. Cl.
USPC .............................................. 351/63

(58) Field of Classification Search
USPC ............ 351/63, 69, 76, 178, 158; 24/3.3, 3.8; 206/37, 38
See application file for complete search history.

(56) References Cited

U.S. PATENT DOCUMENTS

| | | | |
|---|---|---|---|
| 2,283,752 A | 5/1942 | Gonsett | |
| 2,527,947 A | 10/1950 | Loos | |
| 2,734,322 A | 2/1956 | Vaughan | |
| 4,093,291 A | 6/1978 | Schurgin | |
| 4,162,542 A | 7/1979 | Frank | |
| 4,642,816 A | 2/1987 | Miller | |
| 4,656,668 A | 4/1987 | Castrejon | |
| 4,701,962 A | 10/1987 | Simon | |
| 4,793,002 A | 12/1988 | Simon | |
| 4,951,658 A | 8/1990 | Morgan et al. | |
| 4,979,811 A | 12/1990 | Boyer | |
| 5,042,649 A | 8/1991 | McNutt | |
| 5,263,200 A | 11/1993 | Miller | |
| D421,124 S | 2/2000 | Yavitz | |
| D425,623 S | 5/2000 | Funk | |
| D429,817 S | 8/2000 | Banks | |
| 6,131,208 A | 10/2000 | Banks | |
| 6,170,664 B1 | 1/2001 | Dar | |
| D440,660 S | 4/2001 | Sternberg | |
| D444,561 S | 7/2001 | Stein | |
| 7,052,130 B2 | 5/2006 | Fishbaugh | |
| 7,458,456 B2 | 12/2008 | Hogan et al. | |
| 2003/0173234 A1 | 9/2003 | Lin | |
| 2004/0040869 A1* | 3/2004 | Menceles | 206/37 |
| 2004/0218286 A1* | 11/2004 | Harrison | 359/819 |

* cited by examiner

*Primary Examiner* — Scott J Sugarman
*Assistant Examiner* — Mustak Choudhury
(74) *Attorney, Agent, or Firm* — Hovey Williams LLP

(57) ABSTRACT

An eyewear assembly comprising a hollow squeeze case and eyewear sized and configurable to be stored within the squeeze case. The squeeze case may comprise two opposing ends and may present an opening therebetween when the two opposing ends are squeezed toward each other. The eyewear may comprise two lenses and a flexible nose piece extending between the two lenses. The lenses may be actuated toward each other, placing the eyewear into a folded configuration, such that the eyewear may fit within the squeeze case. The squeeze case may also comprise a hole for attachment to a key chain or lanyard.

19 Claims, 4 Drawing Sheets

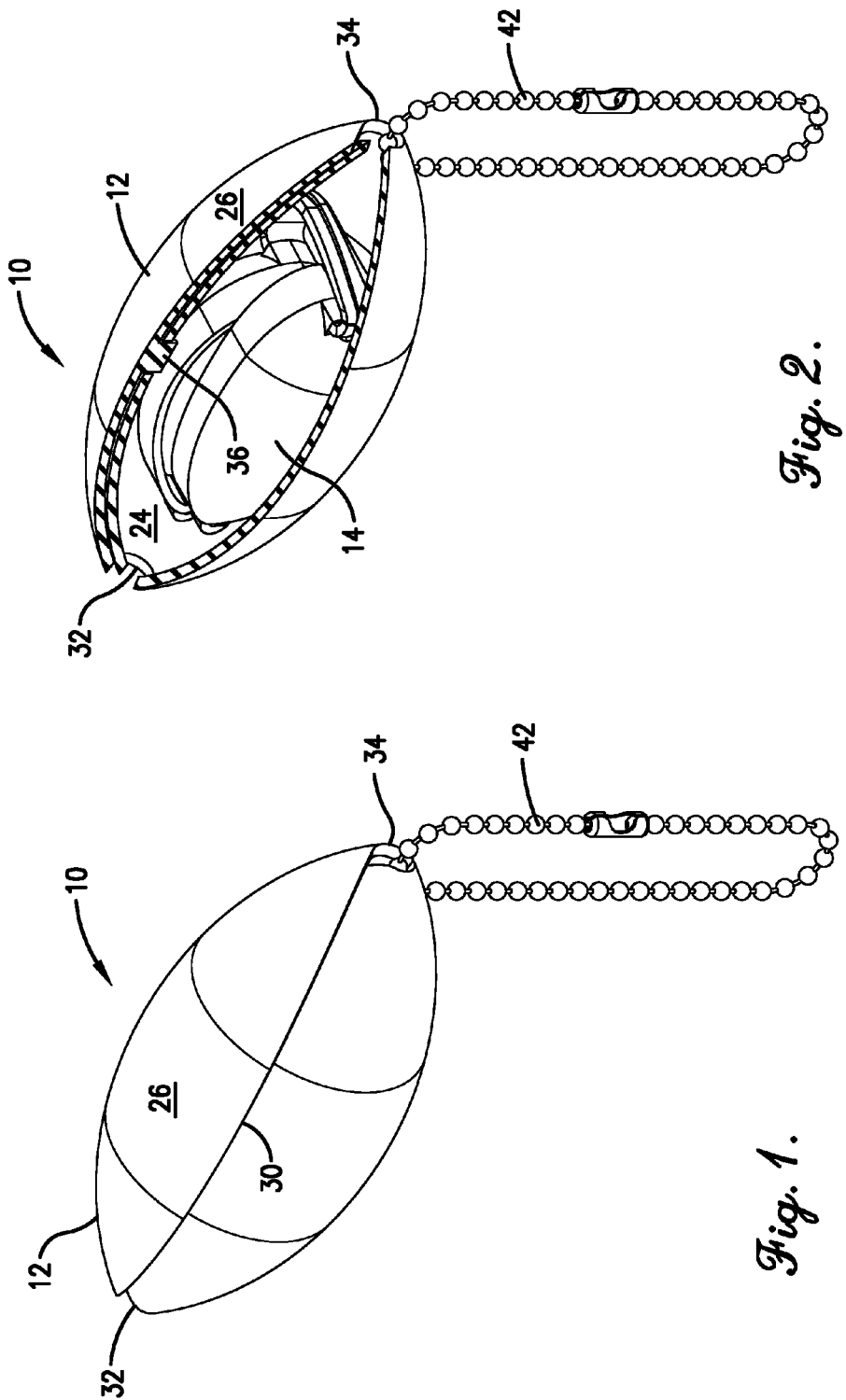

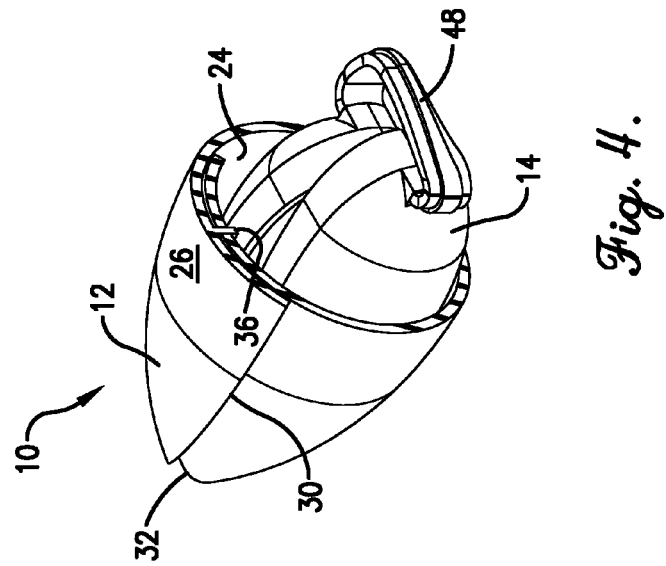
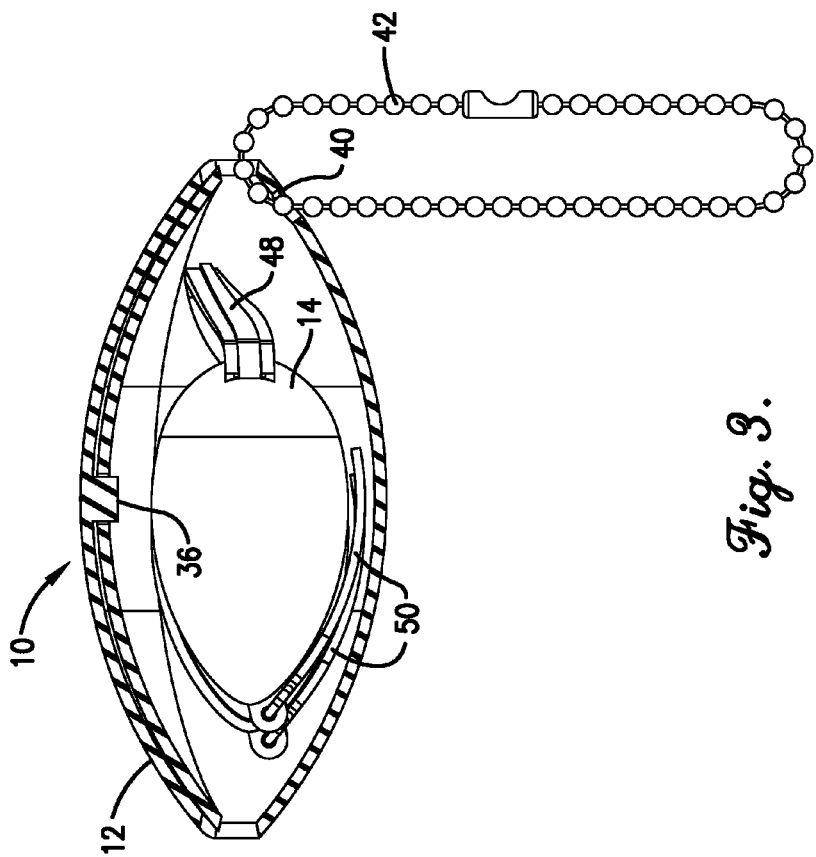

PROTECTIVE EYEWEAR

RELATED APPLICATIONS

The present utility patent application claims priority benefit, with regard to all common subject matter, of earlier-filed U.S. provisional patent application titled "PROTECTIVE EYEWEAR" Ser. No. 61/419,441, filed Dec. 3, 2010, hereby incorporated in its entirety by reference into the present application.

BACKGROUND

1. Field

Embodiments of the present invention relate to eyewear. More particularly, embodiments of the present invention relate an eyewear assembly for providing portable protective eyewear.

2. Related Art

While tanning, either in a booth or in natural sunlight, it is often desirable to use protective eyewear to limit the amount of light that reaches the user's eyes. Conventional sunglasses may limit the amount of light reaching the user's eyes, but may also prevent certain portions of the user's face from tanning, resulting in an undesirable tan pattern. For this and other reasons, pairs of individual protective lenses, each lens adapted to cover an eye of the user, have been adopted to minimize the unnecessary shading of the user's face during tanning. Unfortunately, the lenses are relatively small and may be inadvertently separated or lost. Furthermore, various protective cases available for these lenses can be difficult to open, and one or both of the lenses may inadvertently fall out of the case while the user attempts to open the case.

SUMMARY

An eyewear assembly according to embodiments of the present invention may comprise a flexible, hollow squeeze case having two opposing ends, and eyewear configured to be placed within the squeeze case. The hollow squeeze case may be operable to be placed in a closed position and/or actuated into an open position when the two opposing ends are squeezed toward each other, presenting an opening into the hollow squeeze case. The eyewear may be movable between a folded configuration and an unfolded configuration, and may be configured to be placed within the squeeze case in the folded configuration. The eyewear may comprise two lenses and a flexible nose piece extending between the lenses.

A method of storing and using eyewear, such as the eyewear described above, may include the steps of squeezing two opposing ends of a hollow squeeze case toward each other such that an opening is presented between the two opposing ends. Then the method may include removing eyewear from the squeeze case and actuating lenses of the eyewear away from one another, from a folded configuration into an unfolded configuration. Finally, the method may include a step of placing the lenses over the user's eyes such that the nose piece rests on a bridge of a nose of the user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWINGS

Embodiments of the present invention are described in detail below with reference to the attached drawing figures, wherein:

FIG. 1 is a perspective view of a squeeze case constructed in accordance with an embodiment of the present invention, resting in a closed position and configured to house eyewear therein;

FIG. 2 is a perspective view of the squeeze case of FIG. 1 with a portion thereof cut away to illustrate the eyewear, in a folded configuration, housed within the squeeze case;

FIG. 3 is a cross-sectional view of the squeeze case of FIG. 1 with the eyewear housed therein;

FIG. 4 is another cross-sectional view of the squeeze case of FIG. 1 with the eyewear housed therein;

Figure 5:
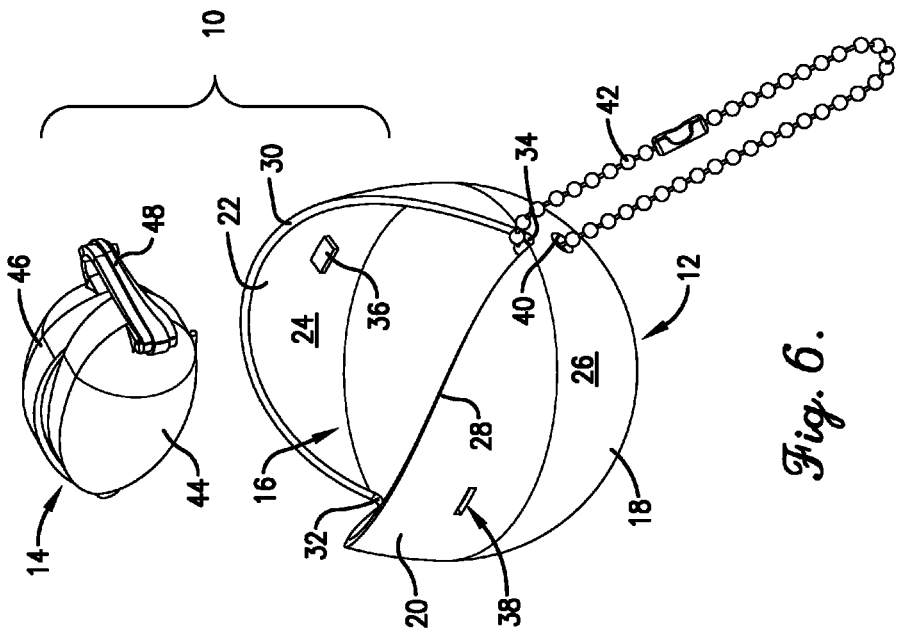
FIG. 5 is a perspective view of the squeeze case of FIG. 1 being squeezed into an open position by a user.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

As illustrated in FIGS. 1-7, an eyewear apparatus 10, according to various embodiments of the present invention, comprises a squeeze case 12 and eyewear 14. In a closed position, the squeeze case 12 may resemble the shape of a hollow football with a cross-sectional area that tapers toward opposing ends thereof, such as those used in sports like American football, as illustrated in FIG. 1. The squeeze case 12 may be naturally biased in the closed position, as in FIGS.

1-4. When pressure is applied simultaneously at each end of the football-shaped squeeze case 12, the squeeze case 12 may flex into an open position, as in FIGS. 5 and 6.

The squeeze case 12 may be made of a flexible material, such as flexible PVC. For example, the squeeze case 12 may be made of material having properties within any of the broad, intermediate, or narrow ranges shown below in table 1.

TABLE 1

| Typical Properties | ASTM Test | Squeeze Case (broad) | Squeeze Case (intermediate) | Squeeze Case (narrow) |
|---|---|---|---|---|
| Specific Gravity | ASTM-792 | 0.57-1.171 | 0.912-1.368 | 1.12-1.16 |
| Shores-Hardness | ASTM-2240 | 30°-90° Shores-A | 48°-72° Shores-A | 58°-62° Shores-A |
| Flexural Modulus | ASTM-638 | 1150-3450 PSI | 1840-2760 PSI | 2185-2415 PSI |
| Tensile Elongation | ASTM-638 | 120-360% | 192-288% | 228-252% |

Figure 6:
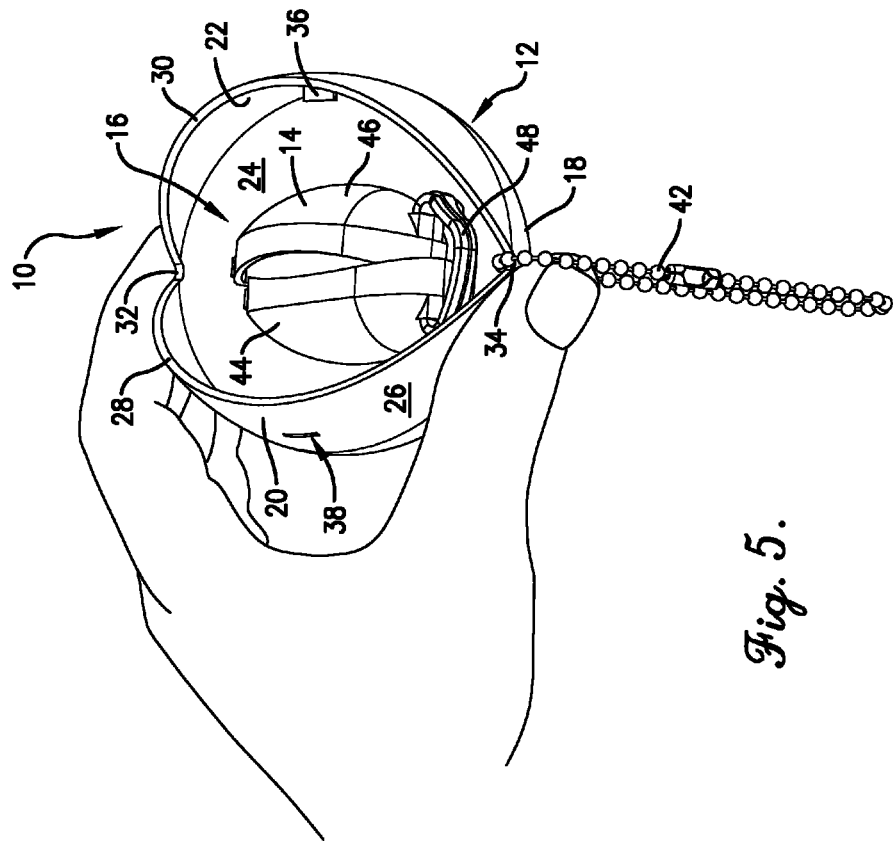
FIG. 6 is a perspective view of the squeeze case of FIG. 1 in the open position with the eyewear removed therefrom.
Figure 7:
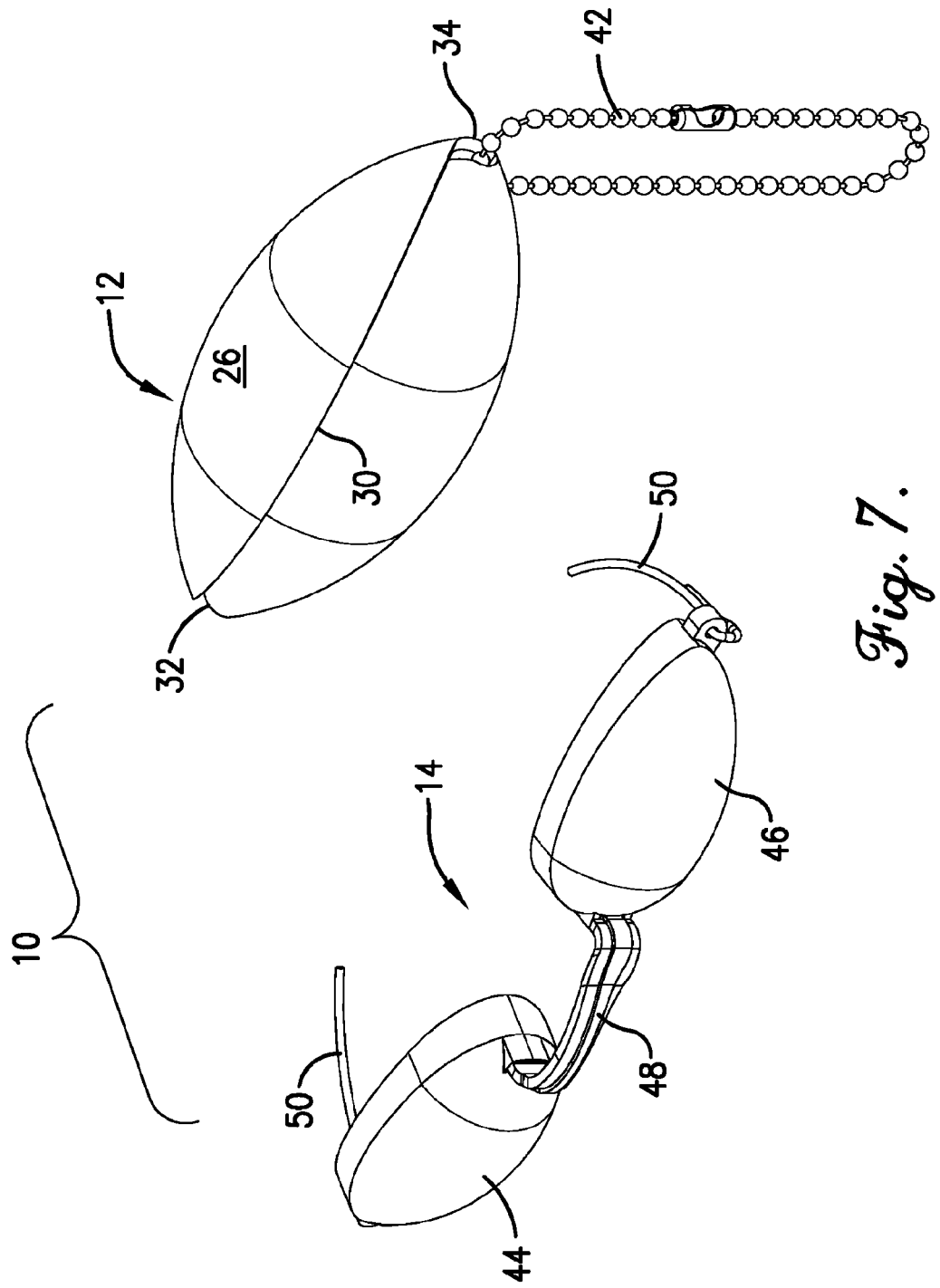
FIG. 7 is a perspective view of the squeeze case of FIG. 1 in the closed position and the eyewear removed therefrom in an unfolded configuration to be worn by a user.

In the open position, as illustrated in FIGS. 5 and 6, the squeeze case 12 may resemble a hollow sphere with a portion removed therefrom to create an opening 16. For example, approximately one quarter of the hollow sphere may be removed therefrom to create the squeeze case. Additionally or alternatively, in the open position, the squeeze case 12 may include a hollow, hemispherical-shaped portion 18 and two lip portions 20,22 extending therefrom. The opening 16 may extend between the two lip portions 20,22 when the squeeze case 12 is forced into the open position, as illustrated in FIG. 5. The lip portions 20,22 may be configured to overlap each other when the squeeze case 12 is in the closed position, as in FIGS. 1-4.

The squeeze case 12 may comprise an inner surface 24, an outer surface 26, a first edge 28 and a second edge 30. The first and second edges 28 and 30 may each extend between ends 32,34 of the squeeze case 12 and form a peripheral boundary of the opening 16 presented when the squeeze case 12 is in the open position. One of the edges 28,30 may overlap at least a portion of the outer surface 26 when the squeeze case is in the closed position, as illustrated in FIGS. 1-4 and 7.

In some embodiments of the invention, the inner surface 24 of the squeeze case 12 may comprise a tab or protrusion 36 proximate to the first edge 28 and the outer surface 26 may comprise a cavity or a tab opening 38 formed therein proximate to the second edge 30 of the squeeze case 12, such that the protrusion 36 may nest within the tab opening 38 to maintain the squeeze case 12 in the closed position, as illustrated in FIGS. 3 and 4. Alternatively, the inner surface 24 may comprise the tab opening 38 and the outer surface 26 may comprise the protrusion 36 configured to nest within the tab opening 38.

In some embodiments of the invention, as illustrated in FIGS. 3 and 6, the squeeze case 12 may have a hole 40 formed therein. The hole 40 may be configured for receiving any attachment device 42 therethrough, such as a lanyard, key chain, key ring, necklace, or other device for attaching the squeeze case 12 to a person or one of their belongings.

The eyewear 14, as illustrated in FIGS. 2-7, is sized and configured to fit inside of the squeeze case 12 and may comprise two lenses 44,46, a flexible nose piece 48 extending between the two lenses 44,46, and/or a strap 50 configured to attach to the two lenses 44,46 and hold the lenses 44,46 in place on a user's head. The lenses 44,46 may be made of any rigid, partially transparent material and/or may be coated with various optical coatings, such as UV protection coatings.

The lenses 44,46 may each comprise a convex outer surface, a concave inner surface, a peripheral flange extending around a periphery of the lens 44,46, and at least one attachment component configured for interfacing with the nose piece 48 and/or the strap 50. The lenses 44,46 may each be configured such that, when worn by a user, the convex outer surface may face away from the user's eye, the concave inner surface may face the user's eye, and the peripheral flange may extend in a direction toward the user's face and/or abut the user's face around a periphery of the user's eye.

The attachment component may include a nose piece attachment and/or a strap attachment. The nose piece attachment may comprise an opening extending through the lens 44,46 and may include one or more tabs for securing the nose piece 48 to the lens 44,46. The strap attachment may comprise an opening extending through the lens 44,46 and/or a tab extending from the lens 44,46, the tab having an opening or hole formed therethrough. The strap 50 may be inserted into the opening or hole of the strap attachment and then tied thereto. However, any means of attaching the strap 50 and the nose piece 48 to the lenses 44,46 may be used without departing from the scope of the invention.

The nose piece 48 may be a strip of semi-flexible material shaped to curve around a bridge of a user's nose. For example, the nose piece 48 may be made out of material having properties within any of the broad, intermediate, or narrow ranges presented in Table 2, below. The nose piece 48 may also include one or more tabs extending therefrom at or proximate to opposing ends of the nose piece 48. The tabs may be configured to mate with the nose piece attachment of each of the lenses 44,46.

TABLE 2

| Typical Properties | Nose Piece (broad) | Nose Piece (intermediate) | Nose Piece (narrow) |
|---|---|---|---|
| Specific Gravity | 0.6-1.8 | 0.96-1.44 | 1.18-1.22 |
| Shores-Hardness | 45°-100° Shores-A | 72°-97° Shores-A | 88°-92° Shores-A |
| Flexural Modulus | 1675-5025 PSI | 2680-4020 PSI | 3182-3518 PSI |
| Tensile Elongation | 90-270% | 144-216% | 171-189% |

The strap 50 may be a flexible and/or stretchable cord, string, or band configured to mate with the strap attachment. Alternatively or additionally, the strap 50 may comprise an adjustment mechanism configured for increasing and/or decreasing the length of the strap.

To place the eyewear 14 into the squeeze case 12, the eyewear may be placed into a folded configuration, as illustrated in FIGS. 2-6, by a user actuating the lenses 44,46 toward each other such that the concave inner surfaces of the lenses 44,46 may substantially face each other. The strap 50 may remain attached to each of the lenses 44,46 or may be unattached from the strap attachment. The lenses 44,46, nose piece 48, and strap 50 may be inserted into the squeeze case 12 through its opening 16 while the squeeze case 12 is actuated into the open position, as illustrated in FIGS. 5 and 6. Then the squeeze case 12 may be released into its closed position, as in FIG. 7, and/or actuated into its closed position until the protrusion 36 of the squeeze case 12 rests within the tab opening 38 of the squeeze case 12.

In use, a user may squeeze the squeeze case 12 to open it, such as by pressing the ends 32,34 thereof toward each other with a thumb and forefinger, as illustrated in FIG. 5. This may present the opening 16 between the two opposing ends 32,34 and the first and second edges 28,30. Then the user may remove the eyewear 14 from within the squeeze case 12 and actuate the eyewear 14 from the folded configuration into an unfolded configuration by moving the lenses 44,46 outward, away from each other, as in FIG. 7. Next, the user may place the lenses 44,46 of the eyewear 14 over his or her eyes. In some embodiments of the invention, the user may also attach the strap 50 to the lenses 44,46 and place the strap 50 around his or her head to keep the lenses 44,46 aligned with the user's eyes and to keep the nose piece 48 aligned with a bridge of the user's nose.

Once a user is done with the eyewear 14, the following steps may be followed to place the eyewear 14 back into the squeeze case 12. The user may remove the lenses 44,46 from their eyes and/or remove the nose piece 48 from their nose. The user may also actuate the lenses 44,46 toward each other, such that the eyewear is actuated from the unfolded configuration into the folded configuration via flexing or actuation of the nose piece 48. The user may also squeeze the squeeze case 12 to present the opening 16, then place the eyewear 14 through the opening 16, into the squeeze case 16. Finally, the user may release pressure applied at the opposing ends 32,34 of the squeeze case 12, such that the squeeze case 12 returns from the open position to the closed position. This may involve removing the user's hand from the ends 32,34 of the squeeze case 12 and/or inserting the protrusion 36 into the tab opening 38.

Although the invention has been described with reference to the preferred embodiment illustrated in the attached drawing figures, it is noted that equivalents may be employed and substitutions made herein without departing from the scope of the invention. For example, the protrusion 36 and tab opening 38 may be replaced with other securing means for maintaining the squeeze case 12 in the closed position without departing from the scope of the invention.

Having thus described various embodiments of the invention, what is claimed as new and desired to be protected by Letters Patent includes the following:

1. An eyewear assembly comprising:
    a flexible, hollow squeeze case having two opposing ends, wherein the hollow squeeze case is operable to be placed in a closed position and actuated into an open position when the two opposing ends are squeezed toward each other, presenting an opening into the squeeze case, wherein two portions of the squeeze case overlap each other in the closed position and do not overlap each other in the open position; and
    eyewear movable between a folded configuration and an unfolded configuration, and configured to be placed within the squeeze case in the folded configuration.

2. The eyewear assembly of claim 1, wherein the squeeze case has a shape similar to an American football in the closed position.

3. The eyewear assembly of claim 1, wherein the squeeze case has a hole formed therethrough, configured for attachment to a key chain, key ring, lanyard, or necklace.

4. The eyewear assembly of claim 1, wherein the eyewear comprises:
    a pair of semi-transparent lenses each having an outer surface and an inner surface; and
    a flexible nose piece configured to extend between the pair of lenses and rest on a bridge of a user's nose.

5. The eyewear assembly of claim 4, wherein the lenses are protective lenses configured for protecting the user's eyes from particular types of light.

6. The eyewear assembly of claim 4, wherein the eyewear further comprises a strap attachable to the lenses and configured to wrap around the user's head when the lenses are resting over the user's eyes.

7. The eyewear assembly of claim 4, wherein the inner surfaces of the lenses are facing each other in the folded configuration.

8. The eyewear assembly of claim 1, wherein the squeeze case further comprises a first edge and a second edge each extending between the opposing ends of the squeeze case and forming a peripheral boundary of the opening presented when the squeeze case is in the open position.

9. The eyewear assembly of claim 8, wherein the squeeze case further comprises an outer surface and an inner surface and the first edge overlaps a portion of the outer surface of the squeeze case proximate to the second edge in the closed position, wherein the outer surface and the inner surface contact each other in an area between the first and second edges when the squeeze case is in the closed position.

10. The eyewear assembly of claim 9, wherein the squeeze case further comprises a protrusion on the inner surface proximate to the first edge and a cavity on the outer surface proximate to the second edge and having a size and shape substantially matching a size and shape of the protrusion, wherein the protrusion aligns with and fits into the cavity in the closed position.

11. A method of storing and using eyewear, the method comprising:
    squeezing two opposing ends of a hollow squeeze case toward each other to place the squeeze case in an open position such that an opening is presented between the two opposing ends;
    removing eyewear comprising two lenses and a flexible nose piece extending therebetween from the squeeze case;
    placing the squeeze case in a closed position wherein two portions of the squeeze case which do not overlap each other in the open position overlap each other in the closed position;
    actuating the lenses away from one another, from a folded configuration into an unfolded configuration; and
    placing the lenses over the user's eyes such that the nose piece rests on a bridge of a nose of the user.

12. The method of claim 11, further comprising, attaching a strap to each of the lenses such that the strap wraps around the user's head when the lenses are placed over the user's eyes.

13. The method of claim 11, further comprising the steps of:
    removing the lenses from the user's eyes and the nose piece from the user's nose;
    actuating the lenses toward each other, from the unfolded configuration into the folded configuration;
    squeezing the squeeze case to present the opening;
    placing the eyewear through the opening and into the squeeze case; and
    releasing pressure applied at the opposing ends of the squeeze case, such that the squeeze case returns from the open position into the closed position.

14. The method of claim 13, wherein the squeeze case has an outer surface, an inner surface, a first edge, and a second edge, wherein the first edge and the second edge form a peripheral boundary of the opening.

15. The method of claim 14, further comprising inserting a protrusion extending from the inner surface proximate to the first edge into a tab opening or cavity formed into the outer surface proximate to the second edge, securing the squeeze case in the closed position.

16. An eyewear assembly comprising:
- a flexible, hollow squeeze case having an inner surface, an outer surface, two opposing ends, a first edge and a second edge, wherein the squeeze case is operable to be placed in a closed position and actuated into an open position when the two opposing ends are squeezed toward each other, presenting an opening into the squeeze case, wherein the first and second edges each extend between the opposing ends of the squeeze case and form a peripheral boundary of the opening when the squeeze case is in the open position, wherein the first edge overlaps a portion of the outer surface of the squeeze case proximate to the second edge in the closed position, wherein a cross-sectional area of the squeeze case in the closed position tapers toward each of the ends; and
- eyewear movable between a folded configuration and an unfolded configuration, and configured to be placed within the squeeze case in the folded configuration.

17. The eyewear assembly of claim 16, wherein the squeeze case has a shape similar to an American football in the closed position, wherein the squeeze case has a hole formed therethrough, configured for attachment to a key chain, key ring, lanyard, or necklace.

18. The eyewear assembly of claim 16, wherein the eyewear comprises:
- a pair of semi-transparent lenses each having an outer surface and an inner surface, wherein the inner surfaces of the lenses are facing each other in the folded configuration;
- a flexible nose piece configured to extend between the pair of lenses and rest on a bridge of a user's nose; and
- a strap attachable to the lenses and configured to wrap around the user's head when the lenses are resting over the user's eyes.

19. The eyewear assembly of claim 16, wherein the squeeze case further comprises a protrusion on the inner surface proximate to the first edge and a tab opening or cavity on the outer surface proximate to the second edge and having a size and shape substantially matching a size and shape of the protrusion, wherein the protrusion aligns with and fits into the tab opening or cavity in the closed position.

\* \* \* \* \*